March 5, 1963
R. S. LUNDIN ETAL
3,080,494
SWITCHING MOTOR
Filed Oct. 14, 1959
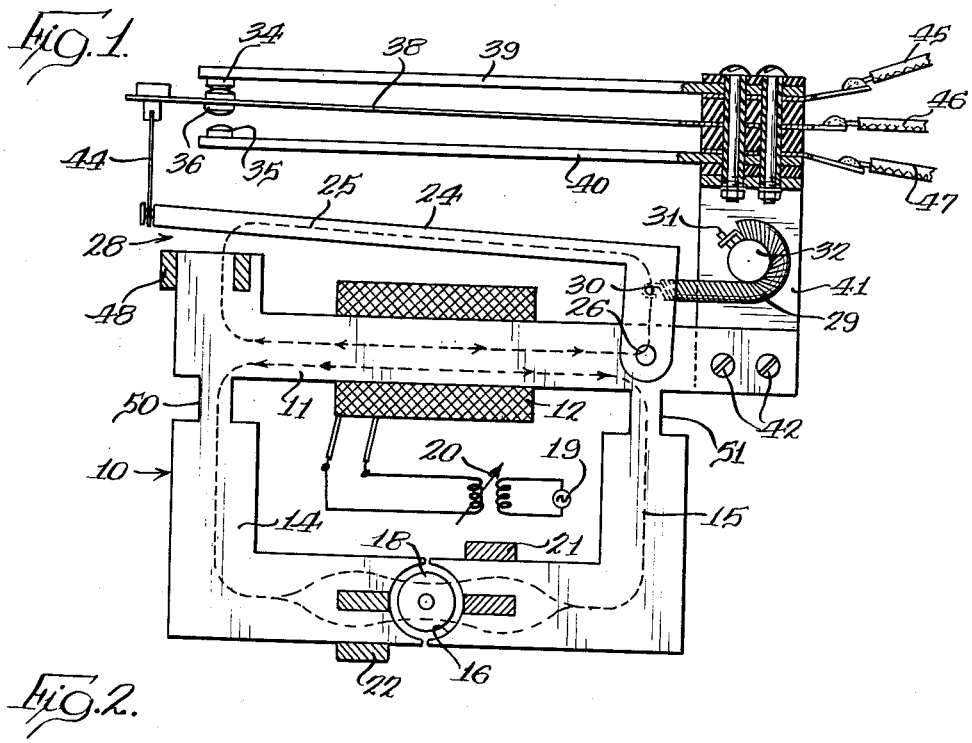
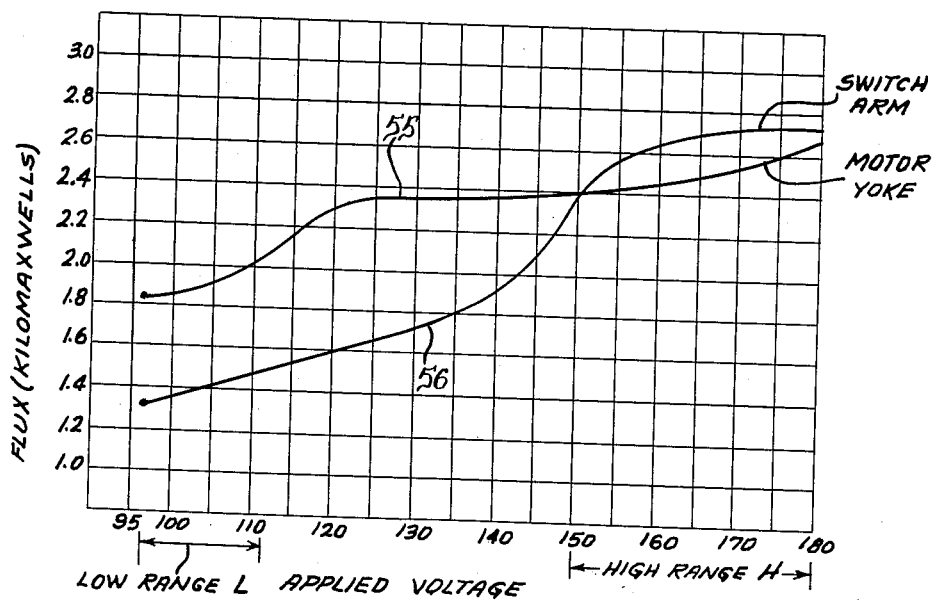
INVENTORS.
Robert S. Lundin
Carl J. Goodhouse
By
Atty.

United States Patent Office 3,080,494
Patented Mar. 5, 1963

3,080,494
SWITCHING MOTOR
Robert S. Lundin, Thomaston, and Carl J. Goodhouse, Litchfield, Conn., assignors to General Time Corporation, New York, N.Y., a corporation of Delaware
Filed Oct. 14, 1959, Ser. No. 846,430
5 Claims. (Cl. 310—68)

The present invention relates in general to electrical apparatus and in particular to motors and voltage-sensitive switches.

The primary object of the invention is to bring forth a motor and a voltage-sensitive, relay-type switch which utilize the same exciting winding and essentially the same magnetic core. That is, it is an object to provide a motor and a remotely controllable voltage-sensitive switching means which together require but one magnetomotive force generating means.

In a more specific sense, it is the aim of the invention to provide a motor and an electromagnetic switching device which use the same winding and core, the two being cooperatively arranged so that the motor operates equally well at two levels of excitation of the winding, while the switching device is deactuated or actuated when the excitation is respectively at the lower or higher level.

A further object of the invention is to provide for a non-linear voltage versus flux variation in the magnetic circuit for a motor, thereby assuring that an associated switching device pulls in or drops out when the excitation is changed within a range which affords useful output torque from the motor itself.

Still another object is to provide such a switching motor which operates from alternating exciting voltages, and yet which avoids wave form distortion which might cause loss of motor torque.

Other objects and advantages will become apparent from the following detailed description and from the accompanying drawing in which FIGURE 1 is a diagrammatic elevation, partially in section, of a switching motor constructed in accordance with the invention, and FIG. 2 is a graphic illustration of the flux versus exciting voltage characteristics for that motor.

While the invention has been shown and will be described in some detail with reference to a particular embodiment thereof, there is no intention that it thus be limited to such detail. On the contrary, it is intended here to cover all modifications, alterations and equivalents falling within the spirit and scope of the invention as defined by the appended claims.

The switching motor shown in FIG. 1 includes a core structure 10 which preferably is fabricated of laminated ferromagnetic material. Viewed in a general sense, the core structure is one having three "legs" and two "windows," thereby defining two closed flux paths which pass in common through one of the legs. Considered in more detail, the core structure 10 comprises a first leg 11 on which is disposed a suitable exciting winding 12. Joined to the first leg 11 is a second U-shaped leg 14 which thus completes a closed-loop path 15 around which magnetic flux passes in response to current excitation applied to the winding 12.

Formed in the second leg 14 is a gap 16 traversed by flux following the path 15. Rotatably disposed within the gap 16 and reducing it to a narrow width so it has low reluctance is a motor armature 18 which in the present instance is a hysteresis type rotor. While the invention is applicable to arrangements using D.C. excitation of the winding 12 and D.C. motor armature in the gap 16, the embodiment here shown is intended to be energized from an alternating current source. By way of example, FIG. 1 shows the winding 12 excited from an appropriate alternating voltage source 19 through a variable-coupling transformer 20. The amplitude of the exciting voltage applied to the winding 12 may thus be adjusted over a relatively wide range. To make the motor armature 18 self-starting in response to the alternating flux produced in the path 15 in response to such excitation of the winding 12, a pair of shading rings 21 and 22 are fitted into the core leg 14 on opposite sides of the gap 16.

As thus far described, the legs 11 and 14 together with the exciting winding 12 and the armature 18 form a typical shaded pole motor of the type used for synchronous operation in timing devices, electric clocks and the like.

In accordance with one of the features of the invention, the core leg 11 and the exciting winding 12 are utilized also to provide a voltage-sensitive, relay-type switching device. For this purpose, a third leg of suitable ferromagnetic material is formed by a member or arm 24 which is movable relative to the leg 11 and which forms therewith a closed flux path 25 around which magnetic flux passes in response to excitation of the winding 12. In the present instance, the arm 24 is bifurcated at its right end, and straddles the leg 11 to receive a pivot pin 26. The arm 24 may swing about the pin 26 as a pivot thereby opening and closing a relatively wide, high reluctance air gap 28 between its left end portion and the leg 11.

To effect relay-type operation, means are provided to yieldably bias the movable member or arm 24 to a first position displaced from the leg 11, i.e., in which the gap 28 is open. As here shown, a tension spring 29 is connected to a pin 30 on the arm 24 and anchored to a pin 31 projecting from a rotatably adjustable lug 32. The spring 29 urges the arm 24 in a clockwise direction about the pivot 26. However, when the excitation of the winding 12 is sufficiently great, then magnetic flux passing across the air gap 28 will create such an attractive force on the left end of the arm 24 that it will be rocked counterclockwise about the pivot 26 to close the gap 28.

Electric switching means are provided and connected with the arm 24 to be actuated in response to movement thereof. As here shown, stationary switch contacts 34 and 35 are disposed above and below a movable contact 36 carried at the end of a resilient metal leaf 38. The stationary contacts 34 and 35 are disposed on metal arms 39 and 40 which together with the leaf 38 are sandwiched between insulating members supported on a bracket 41. The bracket is secured, as by screws 42, to an extending portion of the leg 11, and also carries the adjustable lug 32. The outer end of the leaf 38 is connected by means of a link 44 to the left end of the arm 24.

Thus, the contacts 34, 36 are closed whenever the arm 24 is not attracted to the leg 11. These contacts 34, 36 serve also to limit the movement of the arm 24 away from the leg 11. Conductors 45 and 46 soldered to the arm 39 and leaf 38 thus connect to the opposite sides of normally closed switch contacts 34, 36. When the arm 24 is attracted to the leg 11 and the gap 28 is closed, the contacts 36 and 35 are electrically united by a downward deflection of the leaf 38. Thus, conductors 46 and 47 lead from normally open switch contacts 35, 36.

In order to eliminate "chatter" of the arm 24, a shading ring 48 is disposed on the leg 11 adjacent the gap 28.

In accordance with another feature of the invention, provision is made to assure that the motor armature 18 will continue to produce a useful output torque as the magnitude of the exciting voltage applied to the winding 12 is varied over a wide range. To accomplish this, the core for the motor armature 18 is constructed so as to magnetically saturate as the excitation applied to the winding 12 is increased above a predetermined value. This is done by choosing the effective cross-sectional area of the leg 14, in coordination with the magnetization curve of the material forming such leg, so that the flux does not increase appreciably after it has reached a certain value. In the present embodiment, the leg 14 is constructed with sections 50 and 51 of reduced cross-sectional area so that the tendency is to prevent increases in flux crossing the gap 16 as the exciting voltage applied to the winding 12 increases beyond a certain value. The importance of this will become apparent in the following description of the manner in which the device of FIGURE 1 operates.

The particular switching motor shown in FIGURE 1 is intended to have its motor operate continuously and its switch contacts be actuated or deactuated when the exciting voltage applied to the winding 12 is respectively within a low range L or a high range H (FIG. 2). This imposes severe requirements of non-sensitivity to the magnitude of the excitation voltage for motor operation, but a high degree of voltage sensitivity for the switching action of the movable member 24. Such requirements are met by coaction and cooperation between the structure which defines the two flux paths 15 and 25.

Let it be assumed first that the source of variable exciting voltage, here shown as the variable coupling transformer 20, is adjusted to excite the winding 12 with a voltage which lies in the low range L, e.g., 95 to 112 volts A.C. The motor flux passing around the path 15 and represented by the curve 55 in FIG. 2 thus takes on a certain amplitude which in the present example is on the order of 1.7 kilomaxwells. This is sufficient to drive the rotor 18 at synchronous speed and with useful output torque. The flux path 25 for the switching device, however, contains a considerably smaller amount of flux, represented by the curve 56 in FIG. 2, since it includes the air gap 28 which has very high reluctance. Thus, when the exciting voltage applied to the winding 12 is in the low range L, the flux traversing the path 25 has a relatively low value on the order of 1.4 kilomaxwells. This flux crossing the gap 28 exerts a counterclockwise torque on the movable member 24 which is insufficient to overcome the bias of the spring 29. Accordingly, the gap 28 remains open and the switch contacts 34, 36 and 35, 36 remain deactuated. The ratio of the reluctance of the flux paths 15 and 24 is on the order of 1.4 to 1.7 or about 0.82 and remains substantially at this ratio over the range L.

When the exciting voltage is increased to the high range H in FIG. 2, the movable member 24 must be attracted to close the gap 28 against the bias of the spring 29, while the motor armature 18 must continue to rotate and provide useful output torque. If the leg 14 were made of large effective cross-sectional area, an increase in the exciting voltage applied to the winding 12 would create simply a large increase in flux through the motor path 15 and a small increase in the flux in the switching path 25 due to the fact that the reluctance of the path 25 is much higher than that of the path 15. To produce a sufficient increase in flux within the path 25 to attract the member 24 to the leg 11, the winding 12 would have to receive a very high voltage. This difficulty is here avoided by constructing the motor leg 14 so that it begins to saturate as the exciting voltage is increased above the range L. That is accomplished by the reduced cross-sectional areas 50 and 51 in the leg 14 which forms a part of the flux path 15. Due to the presence of these smaller areas 50 and 51, which become progressively saturated as more and more flux is passed therethrough, the reluctance of the path 15 progressively increases as the exciting voltage applied to the winding 12 is increased from the low range L toward the high range H. The reluctance of the magnetic flux path 25, however, remains substantially constant. Thus, as the exciting voltage is increased, the ratio of the reluctance of the path 15 to the reluctance of the path 25 is increased so that a larger percentage of the total flux produced by the winding 12 and passing through the leg 11 flows through the arm 24 and the flux path 25 than through the armature 18 and the flux path 15. Whereas the ratio of reluctances for the flux paths 15 and 25 was about 0.82 with an exciting voltage of 105 volts, that ratio is increased to about 1.0 at 150 volts.

This has two effects. First, the non-linear increase in reluctance for the path 15 causes a non-linear increase in the flux within the path 25 as the exciting voltage is increased, so that a more abrupt, positive movement of the arm 24 to close the gap 28 is produced. In the example represented by the graphs of FIG. 2, the arm 24 is shifted against the bias of the spring 29 to close the gap 28 when the exciting voltage reaches a value of about 145 to 150 volts, as a result of the flux represented by the curve 56 reaching a pull-in value of about 2.1 kilomaxwells. Secondly, the reduced area portions 50 and 51 in the leg 14 limit the flux in the armature 18 to some predetermined value, i.e., cause the flux crossing the armature 18 to increase very little with further increases and exciting voltage after the exciting voltage rises above a value of approximately 125 volts. Indeed, the flux in the path 15 increases from about 2.35 to 2.40 kilomaxwells as the exciting voltage is increased from 125 to 150 volts (see FIG. 2). This precludes saturation within the armature 18 which might cause the armature to lose synchronism and useful output torque.

After the excitation voltage is increased to the high range H and the movable member 24 has been attracted to the leg 11 (thereby actuating the switch contacts, i.e., opening the contacts 34, 36 and closing the contacts 35, 36), the reluctance of the flux path 25 is considerably reduced because the air gap 28 is reduced to substantially zero width. Accordingly, the flux within the path 25 increases abruptly and then begins to saturate as shown by that portion of the curve 56 between the voltage values of 150–180 in FIG. 2. This reduction in the reluctance of the flux path 25 in response to closure of the gap 28 permits more flux to be passed through that path, and thus lessens the increase in flux which would otherwise occur in the flux path 15 as the exciting voltage is increased from 150 to 180 volts. As a result, the reduced area portions 50 and 51 in the leg 14 do not become so totally saturated as to produce serious distortion of the wave form of the flux passing therethrough. The variation in flux traversing the gap 16 and the armature 18 remains sufficiently sinusoidal to keep the motor 18 operating at synchronous speed.

As the exciting voltage applied to the winding 12 is reduced from the high range H to a low range L, the reverse action of that previously described will occur. The motor 18 continues to operate at synchronous speed with useful output torque, and the bias of the spring 29 will return the movable arm 24 to its "open" position after the exciting voltage is reduced below about 125 volts. It will be seen from FIG. 2 that as the voltage is reduced from 150 to a point below 125 volts, the reluctance of the motor flux path 15 decreases abruptly, so that a greater proportion of flux will pass through the motor armature 18, and a lesser proportion through the flux path 25. Accordingly, drop-out of the arm 24 occurs reliably and abruptly.

The switching motor here disclosed finds a variety of advantageous applications. It may be employed in any type of control apparatus where timing or time measurement is required, since the motor armature 18 may be connected to synchronously drive timing cams, contacts, or the like. Thus, the present switching motor will be useful in washing machines, driers, automatic refrigerator defrosters, and other such appliance controls. Yet in such apparatus it is frequently desirable to be able to open or close switch contacts, and particularly in response to a supply voltage reaching an unduly high or an unduly low level. The present invention makes it possible to provide a "relay" which is voltage sensitive and therefore selectively actuatable simply by changing the magnitude of applied exciting voltage, and which utilizes for the most part the same magnetic core structure which would otherwise be required for the motor itself. By so constructing the motor yoke or flux path 14 to include saturating portions such as indicated at 50 and 51, a flux-dividing cooperative action is created between the two flux paths, thus assuring reliable pull-in and drop-out of the switching arm in response to changes in the amplitude of an exciting voltage, yet with continued synchronous operation of the motor.

We claim as our invention:

1. In a switching motor, the combination comprising a core structure having a first leg portion and a second leg portion, an exciting winding on said first leg portion, a gap defined in said second leg portion, a motor armature disposed in said gap, means in said second leg portion for causing the latter to substantially saturate as the excitation of said winding is increased from a first to a second value, a movable member adjacent said first leg portion and forming therewith a closed-loop flux path, means yieldably biasing said member away from said first leg portion to form a second air gap, said member and first leg portion being dimensioned to pull the former against the latter in response to flux crossing said second gap when the excitation of said winding is increased above said second value, whereby said motor continues to run as the excitation of said winding is varied above or below said second value to cause movement of said member between two positions 2. The combination set forth in claim 1 further characterized by a pair of electric switch contacts and means for actuating the same in response to movement of said member against said first leg portion.

3. In a switching motor, the combination comprising a closed-loop core of ferromagnetic material and having first and second leg portions, an exciting winding disposed on said first leg portion, a gap defined in said second leg portion and a motor armature rotatably disposed therein, a part of said second leg portion being of lesser cross-sectional area than the remainder and being dimensioned to saturate with magnetic flux as the excitation of said winding is increased beyond a predetermined value, a ferromagnetic arm pivoted to said first leg portion and forming therewith a closed-loop flux path, means yieldably biasing the free end of said arm away from said first leg portion to form a second air gap, said arm and biasing means being proportioned to afford movement of said arm to close said gap when the excitation of said winding exceeds said predetermined value, and a pair of electrical contacts connected to be actuated by movement of said arm.

4. The combination set forth in claim 3 further characterized by shading rings at the gaps defined in said second leg portion and by said arm, said armature being of the induction type, whereby said winding may be excited with an A.C. voltage to operate said motor and the voltage changed to a high or a low range to actuate or deactuate said contacts.

5. In combination, an electric motor comprising a magnetically permeable core forming a closed-loop flux path, said core having first and second leg portions, an exciting winding on said first leg portion, an air gap being defined in said second leg portion and a motor armature rotatably disposed in said gap, a magnetically permeable member movable relative to said core structure and forming with said first leg portion a second closed-loop flux path, means yieldably biasing said member away from said first leg portion to create an air gap therebetween, and switch contacts actuated by said member when it moves toward said first leg portion in response to flux produced by excitation of said winding, said second leg portion including means for making the same substantially saturate as the excitation of said winding is increased from a first value sufficient to drive said armature without causing attraction of said member to said first leg portion to a second value which does cause such attraction.

References Cited in the file of this patent

UNITED STATES PATENTS

| 2,036,003 | Warren | Mar. 31, 1936 |
| 2,489,098 | Marble | Nov. 22, 1949 |

FOREIGN PATENTS

| 757,515 | Germany | Nov. 10, 1952 |